Nov. 6, 1962     V. E. KNAPP ET AL     3,061,923
METHOD OF MAKING COMPOSITE SHEETS
Filed May 11, 1959
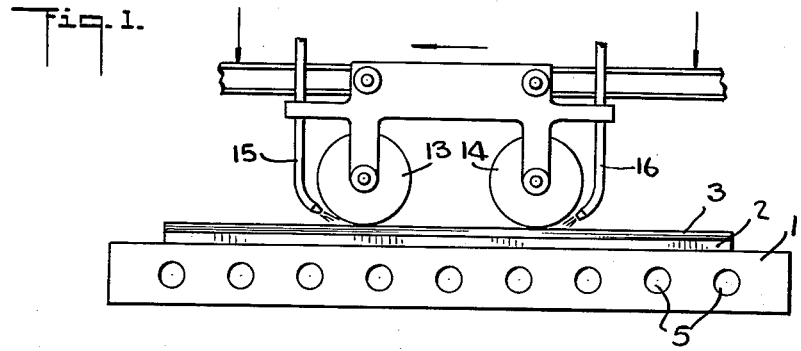
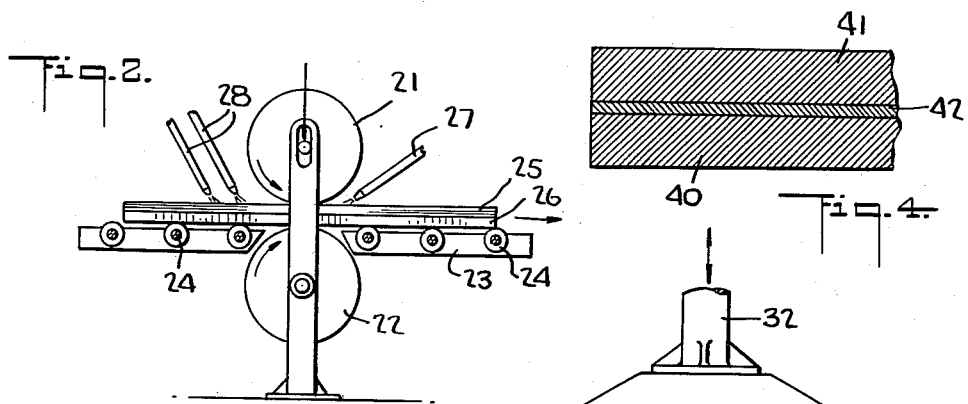
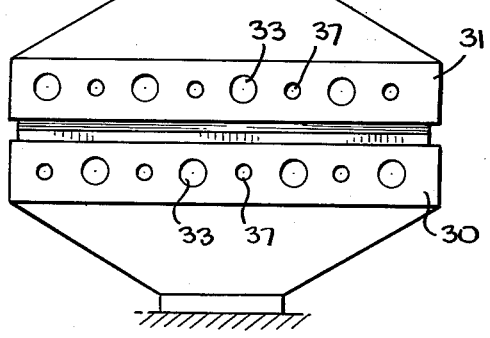
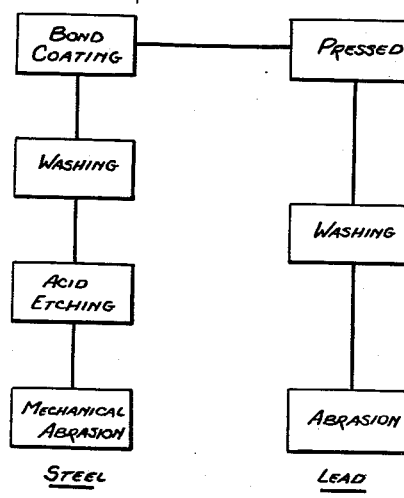
INVENTORS
VICTOR E. KNAPP
BY   NEIL F. RITCHEY
ATTORNEY

United States Patent Office 3,061,923
Patented Nov. 6, 1962

3,061,923
METHOD OF MAKING COMPOSITE SHEETS
Victor E. Knapp, Roslyn, N.Y., and Neil F. Ritchey, Westtown, Pa., assignors to Knapp Mills Incorporated, Long Island City, N.Y., a corporation of New York
Filed May 11, 1959, Ser. No. 812,256
1 Claim. (Cl. 29—487)

The present invention relates to a method and apparatus for metallurgically bonding lead with other metals and, more particularly, it relates to a method and apparatus for forming a composite sheet of metal having a continuous bond which is entirely free from any voids, pin holes, or other irregularities such as occur in presently known processes.

One well known example of lead bonding is where it is desirable to join sheets of a rigid metal such as steel or iron to lead in order to obtain a composite sheet having the strength of the steel portion and having the corrosion resistant properties of the lead coating or layer. One method of joining two such sheets together is described in Shannon Patent No. 1,996,657, dated April 2, 1935.

More recently, steel or iron objects have been coated with lead in the manufacture of shields for protection against the harmful effects of radiation. The radiation shields heretofore used have been made by the previously known methods of bonding, and it has been determined that these bonding methods have produced composite sheets which, in many instances, are unsatisfactory for use as radiation shields.

Applicant has discovered that the unsatisfactory nature of these composite sheets results from the presence of voids and other cavities throughout the bonded portions of the sheet. Even voids or irregularities of relatively small size appear to make the composite shields unreliable for radiation uses. These voids or irregularities provide spots of reduced shielding which, even though very small, when undetected can seriously reduce the over-all shielding effect of a particular shield below the danger point. In addition, these composite sheets are even used in the shielding applications where additional forming, including bending, cutting, and stretching, may be necessary. When thus handled, these defects may result in additional separation or may permit subsequent corrosion or deterioration of the shielding, which also adversely affects the effectiveness of the completed shield.

Accordingly, the present invention is directed to a novel method and apparatus for forming composite sheets of lead and steel or other metals wherein the bond between the lead and the other metal is continuous and uninterrupted and has no irregularities or voids. It has been discovered that the above-discussed defects result from a bonding process in which the lead and the other metal are bonded together by a suitable bonding metal under high pressure at elevated temperatures and wherein the pressures are released while the bonded plates remain for a considerable period at elevated temperatures. It has further been discovered that a complete and continuous bonding results when the temperature of the composite sheet is rapidly reduced at the instant that the pressure is released from the composite sheet.

Accordingly, an object of the present invention is to provide an improved method for bonding lead and other metals.

Another object of the present invention is to provide an improved apparatus for bonding lead and other metals.

Another object of the present invention is to provide a rapid and inexpensive method of producing improved composite sheets of lead and steel or iron.

Another object of the present invention is to provide a means for bonding lead and steel or iron sheets including a device for rapidly cooling the bonded sheets.

Other and further objects of the invention will be obvious upon an understanding of the illustrative embodiment about to be described, or will be indicated in the appended claim, and various advantages not referred to herein will occur to one skilled in the art upon employment of the invention in practice.

A preferred embodiment of the invention has been chosen for purposes of illustration and description and is shown in the accompanying drawings, forming a part of the specification, wherein:

FIG. 1 is a diagrammatic representation of a preferred embodiment of a bonding means according to the present invention;

FIG. 2 is another embodiment of apparatus for bonding in accordance with the present invention;

FIG. 3 is a diagrammatic representation of still another embodiment of apparatus for bonding in accordance with the present invention;

FIG. 4 is an enlarged detailed cross section of a composite sheet formed in accordance with the method of the present invention, and FIG. 5 is a diagram of the bonding method according to the present invention.

The method of the present invention will first be described generally with particular reference to the diagram of FIG. 5. As illustrated in the diagram, the steel or iron is first prepared for the bonding operation by having one surface cleaned. The surface of the metal is preferably prepared by mechanical abrasion followed by acid etching and washing. Thereafter, a suitable bonding metal in the form of a coating is applied to the cleaned surface of the steel or iron. A suitable bonding metal may be comprised of a solder and tin eutectic alloy. This alloy is best applied by raising the temperature of the steel or iron above the melting point of the eutectic alloy so that it will be melted by and adhered to the cleaned surface. A suitable eutectic bonding alloy may comprise 59% tin and 41% lead although other eutectic alloys may be used, if desired.

The surface of the lead sheet which is to be bonded to the steel or iron is also cleaned by mechanical abrasion and suitable scrubbing or washing.

The prepared steel or iron sheet and the lead sheet are then heated to raise their temperature above the melting point of the bonding eutectic alloy but below the melting temperature of the lead. The surfaces to be bonded are now brought together under pressure to form the composite sheet. As the pressure is released from each portion of the sheets, the sheets are rapidly cooled or quenched to solidify the bonding metal before the sheets have had a chance to separate or otherwise draw apart. The resulting composite sheet will have no voids, pin holes or other irregularities therein.

The preferred means of carying out the process is illustrated in FIG. 1 and comprises means for successive pressure bonding and cooling. This pressure and cooling means comprises a table 1 which is preferably heated by suitable heater elements 5. The sheets of steel or iron and of lead 2 and 3, respectively, are placed upon the table after they have been suitably cleaned and after the surface of the steel or iron has been coated with the bonding coating. The plates 2 and 3 are kept on the table until their temperature is raised above the melting point of the bonding alloy but below the melting point of the lead. When the sheets have reached this temperature, the pressure rollers 13 and 14 are moved over the superimposed plates to force the lead sheet tightly against the liquid bonding metal on the surface of the iron or steel sheet. The roller 13 is preferably heated by heating unit 15 in order to permit it to apply pressure to the superimposed sheets without reducing the temperature of the melted bonding metal. The roller 14 is not heated and immediately behind the roller 14 a cooling or quenching means 16 is mounted to eject a cooling liquid or a gas directly onto the superimposed metal sheets to provide a rapid cooling or quenching operation which acts to solidify the bonding metal at or before the release of the pressure. This prevents any subsequent movement or separation of the sheets which might result from expansion or deformation of the sheets occurring if the sheets were cooled slowly wherein the bonding metal would remain in a liquid state for a substantial period after the release of the bonding pressure.

FIG. 2 illustrates another embodiment of the apparatus in which the pressure applying rollers 21 and 22 are mounted adjacent the top of a table 23 having rollers 24 mounted thereon to permit movement of the sheets of lead and steel or iron 25 and 26, respectively. After being cleaned and heated and superimposed, the sheets 25 and 26 are passed through the driven rollers 21 and 22 and the sheets 25 and 26 are forced together by the rollers to provide a perfect bond between the bonding metal and the sheets. A preheating means 27 raises the temperature of the superimposed plates above the melting point of the bonding metal so that the bonding metal is in a liquid form when the pressure is applied to the superimposed sheets by the rollers 21 and 22. A cooling or quenching device 28 is mounted on the output side of the rollers 21 and 22 to apply a stream of cooling fluid or gas to the sheets to rapidly cool the sheets and solidify the bonding metal immediately before or at the point at which the pressure is released from the bonded sheets.

FIG. 3 illustrates still another embodiment of the apparatus for bonding the sheets in accordance with the method of the invention wherein the sheets are pressed between a stationary platen 30 and a movable platen 31 attached to a suitable press 32. Heater elements 33 are provided in each of the platens to raise the temperature of the sheets above the melting point of the bonding metal and to maintain this temperature as the superimposed sheets are pressed between the platens. Immediately before the release of the pressure and the lifting of the upper platen, the heater elements 33 are disconnected and the platens are cooled by the cooling elements 37 which may comprise suitable conduits adapted to carry a cooling gas or liquid which is formed through the platens at a very low temperature to rapidly cool both the platen and the sheets and to thereby solidify the bonding metal immediately before the release of the bonding pressure.

FIG. 4 illustrates the bonded sheets in cross section wherein an iron or steel sheet 40 is attached to a lead sheet 41 by a continuous bonding interface 42 which is completely free from the undesirable voids or separations.

The method of the present invention is suitable not only for commercially pure lead but also for lead containing other elements such as antimony, bismuth, tin, cadmium, etc. The term "iron" herein also refers not only to pure iron but also to various compounds and forms of iron including, but not limited to, steel.

While the description of the preferred embodiment of the apparatus and the method uses iron or steel as an example, the method and apparatus are applicable to the bonding of lead to other metals using a suitable bonding coating. Lead, for example, may be bonded to copper using a tin or tin-lead eutectic bonding coating. Lead may be bonded to aluminum where the bonding coating on the aluminum comprises a nickel coating and an overlying bonding coating of tin or a tin-lead eutectic.

It will be seen that an improved method and apparatus has been disclosed for metallurgically bonding lead and other metal sheets together with a continuous solid bond having no voids or irregularities. A composite sheet is thus provided which may be used not only in applications where the corrosion resisting properties of the lead is necessary but also in radiation shielding applications where it is essential that the composite sheets have no voids or irregularities which would permit dangerous radiation leaks. Due to the superior uninterrupted bond, composite sheets formed by the present method are also particularly well adapted to subsequent working, including cutting, bending, etc.

As various changes may be made in the form, construction and arrangement of the parts herein without departing from the spirit and scope of the invention and without sacrificing any of its advantages, it is to be understood that all matter herein is to be interpreted as illustrative and not in a limiting sense.

Having thus described our invention, we claim:

The method of bonding a sheet of lead and a sheet of a different metal together which comprises the steps of cleaning a surface of the different metal sheet by mechanical abrasion, thereafter acid etching and washing said surface, applying a bonding coating to the cleaned surface of the said different metal sheet, cleaning a sheet of lead, bringing the coated surface of the said different metal sheet into contact with said cleaned surface of the sheet of lead, heating said sheets and said coating to a temperature higher than the melting point of said coating but lower than the melting point of lead and of said different metal, placing said sheets between pressure-applying means to press said sheets together, moving said sheets and said pressure-applying means relative to each other so that pressure is applied to said sheets progressively along said sheets in increments from one end thereof to the other end, applying heat in advance of progressively applying said pressure, rapidly cooling said sheets and simultaneously releasing the pressure on said sheets to solidify the coating thereby producing a flawless composite sheet of metal.

References Cited in the file of this patent

UNITED STATES PATENTS

| | | |
|---|---|---|
| 132,338 | Warden | Oct. 15, 1872 |
| 1,738,592 | Leonard | Dec. 10, 1929 |
| 1,764,271 | Leonard | June 17, 1930 |
| 1,771,942 | Steenstrup | July 29, 1930 |
| 1,996,657 | Shannon | Apr. 2, 1935 |
| 2,018,259 | Hartley | Oct. 22, 1935 |
| 2,352,325 | Hughey | June 27, 1944 |
| 2,403,221 | Howard | July 2, 1946 |
| 2,627,010 | Matteson et al. | Jan. 27, 1953 |
| 2,693,636 | Simpelaar | Nov. 9, 1954 |
| 2,716,276 | Brown | Aug. 30, 1955 |
| 2,722,735 | Beamish | Nov. 8, 1955 |
| 2,947,077 | Lazarus | Aug. 2, 1960 |